(12) United States Patent
Ito et al.

(10) Patent No.: US 12,215,250 B2
(45) Date of Patent: Feb. 4, 2025

(54) ADHESIVE COMPOSITION AND HEAT-FUSIBLE MEMBER USING SAME

(71) Applicant: TOAGOSEI CO., LTD., Tokyo (JP)

(72) Inventors: Takahiro Ito, Aichi (JP); Makoto Imahori, Aichi (JP); Makoto Hirakawa, Aichi (JP)

(73) Assignee: TOAGOSEI CO., LTD., Tokyo (JP)

( * ) Notice: Subject to any disclaimer, the term of this patent is extended or adjusted under 35 U.S.C. 154(b) by 783 days.

(21) Appl. No.: 16/624,434

(22) PCT Filed: Jun. 18, 2018

(86) PCT No.: PCT/JP2018/023087
§ 371 (c)(1),
(2) Date: Dec. 19, 2019

(87) PCT Pub. No.: WO2019/003977
PCT Pub. Date: Jan. 3, 2019

(65) Prior Publication Data
US 2020/0131413 A1  Apr. 30, 2020

(30) Foreign Application Priority Data
Jun. 26, 2017 (JP) ................. 2017-124637

(51) Int. Cl.
| | | |
|---|---|---|
| *C09J 151/06* | (2006.01) | |
| *B32B 15/085* | (2006.01) | |
| *C08F 20/06* | (2006.01) | |
| *C08F 22/06* | (2006.01) | |
| *C08F 255/04* | (2006.01) | |
| *C08G 18/73* | (2006.01) | |
| *C08G 18/75* | (2006.01) | |
| *C08G 18/78* | (2006.01) | |
| *C08G 18/79* | (2006.01) | |
| *C08J 5/12* | (2006.01) | |
| *C08K 5/29* | (2006.01) | |
| *C09J 5/06* | (2006.01) | |
| *C09J 7/35* | (2018.01) | |
| *C09J 11/06* | (2006.01) | |
| *C09J 123/26* | (2006.01) | |
| *H01M 50/10* | (2021.01) | |
| *H01M 50/105* | (2021.01) | |

(Continued)

(52) U.S. Cl.
CPC ........... *C09J 151/06* (2013.01); *B32B 15/085* (2013.01); *C08F 20/06* (2013.01); *C08F 22/06* (2013.01); *C08F 255/04* (2013.01); *C08G 18/73* (2013.01); *C08G 18/755* (2013.01); *C08G 18/7831* (2013.01); *C08G 18/7837* (2013.01); *C08G 18/7843* (2013.01); *C08G 18/791* (2013.01); *C08J 5/125* (2013.01); *C08K 5/29* (2013.01); *C09J 5/06* (2013.01); *C09J 7/35* (2018.01); *C09J 11/06* (2013.01); *C09J 123/26* (2013.01); *H01M 50/10* (2021.01); *H01M 50/105* (2021.01); *H01M 50/19* (2021.01); *H01M 50/193* (2021.01); *C09J 2203/33* (2013.01); *C09J 2301/312* (2020.08); *C09J 2400/163* (2013.01); *C09J 2423/006* (2013.01); *Y02E 60/10* (2013.01)

(58) Field of Classification Search
CPC ...... C09J 151/06; C09J 7/35; C09J 2423/006; C09J 2203/33; C09J 2400/163; C09J 5/06; C09J 11/06; C09J 123/26; C09J 2301/312; C08F 20/06; C08F 22/06; C08F 255/04; C08G 18/73; C08G 18/755; C08G 18/7831; C08G 18/7837; C08G 18/7843; C08G 18/791; H01M 50/10; H01M 50/105; H01M 50/19; H01M 50/193; C08J 5/125; Y02E 60/10; B32B 15/085; C08K 5/29
See application file for complete search history.

(56) References Cited

U.S. PATENT DOCUMENTS

| | | |
|---|---|---|
| 10,236,479 B2 | 3/2019 | Ojiri et al. |
| 2014/0151230 A1 | 6/2014 | Aiba et al. |

(Continued)

FOREIGN PATENT DOCUMENTS

| | | |
|---|---|---|
| EP | 3561016 A1 | 10/2019 |
| JP | H0418480 A | 1/1992 |
| JP | H04285681 A | 10/1992 |

(Continued)

OTHER PUBLICATIONS

Extended European Search Report issued against corresponding EP Patent Application 18823570.9, in English (8 pages).

(Continued)

*Primary Examiner* — Rabon A Sergent
(74) *Attorney, Agent, or Firm* — Fitch, Even, Tabin & Flannery LLP

(57) ABSTRACT

An adhesive composition having high room-temperature peel strength, high hot peel strength, and excellent adhesion, as well as excellent electrolyte resistance even when used for packaging materials for lithium ion batteries is provided, which contains an organic solvent, a polyolefin (A) that has an acidic group and/or an acid anhydride group and is soluble in the organic solvent, and an isocyanate compound, wherein the isocyanate compound comprises (B) a diisocyanate compound having a C4-7 hydrocarbon group and/or a derivative thereof, and (C) a diisocyanate compound having a C8-14 hydrocarbon group and/or a derivative thereof; and a heat-fusible member using the adhesive composition is also provided.

23 Claims, 1 Drawing Sheet

(51) Int. Cl.
  *H01M 50/19*   (2021.01)
  *H01M 50/193*  (2021.01)

(56) References Cited

U.S. PATENT DOCUMENTS

2018/0162100 A1   6/2018   Fukase et al.
2019/0326564 A1*  10/2019  Kouka .................. C08G 18/73

FOREIGN PATENT DOCUMENTS

| JP | H093147 A | | 1/1997 | |
|---|---|---|---|---|
| JP | 2015001625 A | | 1/2015 | |
| JP | 2015-21108 A | * | 2/2015 | |
| JP | 2015036385 A | | 2/2015 | |
| JP | 2015059200 A | | 3/2015 | |
| JP | 2015206017 A | | 11/2015 | |
| JP | 2016190941 A | | 11/2016 | |
| WO | 2013008640 A1 | | 1/2013 | |
| WO | 2014126235 A1 | | 8/2014 | |
| WO | 2015046378 A1 | | 4/2015 | |
| WO | 2016199551 A1 | | 12/2016 | |
| WO | WO-2018116555 A1 | * | 6/2018 | ............. B32B 15/08 |

OTHER PUBLICATIONS

TW Office Action issued Jul. 28, 2021 against corresponding TW 107120220 Patent Application (8 pages).
Office Action issued against corresponding JP Patent Application No. 2019-526809 dated Feb. 4, 2021 with English translation (12 pages).
Office Action issued against corresponding Korean Patent Application No. 10-2019-7036743 dated Jun. 22, 2022, with English translation, (11 pages).
International Search Report for PCT/JP2018/023087 and English Translation submitted herewith, mailed Jul. 17, 2018, (5 pages).
Written Opinion of the International Searching Authority, mailed Jul. 17, 2018, (5 pages).
Office Action issued against corresponding Japanese Application No. 2021-128253 dated Sep. 16, 2022, English machine translation (5 pages).
Office Action, dated Sep. 16, 2022, issued against corresponding Japanese Application No. 2021-128253, (5 pages).
European Patent Office, Communication pursuant to Article 94(3) EPC issued in Application No. 18 823 570.9, Aug. 23, 2024, 5 pp.
Fechner, Uli et al., "Solubility", iThieme Römpp, Rompp online, Dec. 1, 2007 (Dec. 1, 2007), 6 pp.

* cited by examiner

ADHESIVE COMPOSITION AND HEAT-FUSIBLE MEMBER USING SAME

CROSS-REFERENCE TO RELATED APPLICATIONS

This application is a U.S. national phase application filed under 35 U.S.C. § 371 of International Application No. PCT/JP2018/023087, filed Jun. 18, 2018, which designated the United States, and claims priority from Japanese Patent Application No. 2017-124637, filed Jun. 26, 2017, the complete disclosures of all the applications are hereby incorporated herein by reference in their entirety.

TECHNICAL FIELD

The present invention relates to an adhesive composition and a heat-fusible member using the same, which can be used in various fields of industrial products such as electric fields, automotive fields and industrial fields, and belongs to these technical fields.

BACKGROUND ART

A hot-melt type of adhesive composition is processed into a shape of film or sheet and then is used, and has been utilized in various fields of industrial products such as electric fields, automotive fields and industrial fields, as an adhesive film or sheet which has an adhesive composition laminated onto a surface of a member.

Various adhesive compositions have been proposed in order that a metal member made of iron, aluminum, titanium, another metal, alloy thereof, or the like, which are used in the above fields, is bonded to a molded article made from polyolefin which is poor in adhesion.

Patent Literature 1 discloses an adhesive composition in which components including a carboxylic acid-containing polyolefin, a carboxylic acid-containing epoxy resin, a polyisocyanate compound, and optionally an epoxy resin are dissolved and dispersed in an organic solvent.

Patent Literature 2 discloses an adhesive composition containing a polyolefin having a carboxyl group or acid anhydride group, a polyfunctional isocyanate compound and a solvent, wherein the above polyolefin meets specific values of glass transition temperature, melting point and melting energy.

CITATION LIST

Patent Literature

Patent Literature 1: Japanese Patent Laid-Open No. 4-18480
Patent Literature 2: Japanese Patent Laid-Open No. 2015-36385

SUMMARY OF INVENTION

Technical Problem

However, as for the adhesive compositions described in Patent Literatures 1 and 2, the adhesion at room temperature (hereinafter referred to as "room-temperature peel strength") is 5 N/15 mm or higher, which is in a range of practical use, but is still desired for improvement, and the adhesion at a high temperature of about 80° C. (hereinafter referred to as "hot peel strength") is insufficient.

In addition, when packaging materials for lithium ion batteries are produced with the use of these adhesive compositions, the packaging materials do not come in contact with the electrolytic solution during normal use, but have a problem of being insufficient in an adhesion required for an abnormal situation where they have been immersed in an electrolytic solution at a high temperature of about 80° C. (hereinafter referred to as "electrolyte resistance").

The present invention aims at providing an adhesive composition having an excellent adhesion, that is, a high room-temperature peel strength of 20 N/15 mm or higher and a high hot peel strength of 10 N/15 mm or higher, as well as an excellent electrolyte resistance even when used for packaging materials for lithium ion batteries; and a heat-fusible member using the adhesive composition.

Solution to Problem

The present inventors have made an extensive investigation for solving the above problems, and as a result, have found that an adhesive composition containing an organic solvent, a polyolefin that has an acidic group and/or an acid anhydride group and is soluble in the organic solvent, and specific two types of isocyanate compounds has a high room-temperature peel strength and a high hot peel strength, and thus is excellent in adhesiveness, and also excellent in electrolyte resistance even when used for packaging materials for lithium ion batteries; and have completed the present invention.

Specifically, the present invention, according to one aspect thereof, provides an adhesive composition comprising an organic solvent, a polyolefin (A) that has an acidic group and/or an acid anhydride group and is soluble in the organic solvent, and an isocyanate compound, wherein the isocyanate compound comprises a diisocyanate compound (B) having a hydrocarbon group with 4 to 7 carbon atoms and/or a derivative thereof, and a diisocyanate compound (C) having a hydrocarbon group with 8 to 14 carbon atoms and/or a derivative thereof.

According to a preferred embodiment of the adhesive composition of the present invention, the diisocyanate compound having a hydrocarbon group with 4 to 7 carbon atoms is hexamethylene diisocyanate.

According to another preferred embodiment of the adhesive composition of the present invention, the diisocyanate compound having a hydrocarbon group with 8 to 14 carbon atoms is a diisocyanate compound having at least one secondary isocyanate group.

According to another preferred embodiment of the adhesive composition of the present invention, the diisocyanate compound having a hydrocarbon group with 8 to 14 carbon atoms is isophorone diisocyanate.

According to another preferred embodiment of the adhesive composition of the present invention, the derivative of the diisocyanate compound having a hydrocarbon group with 4 to 7 carbon atoms and/or the derivative of the diisocyanate compound having a hydrocarbon group with 8 to 14 carbon atoms comprise at least one bond selected from the group consisting of an isocyanurate bond, a biuret bond, a urethane bond and an allophanate bond.

According to another preferred embodiment of the adhesive composition of the present invention, the component (A) is a polyolefin graft-modified with an acidic group-containing monomer and/or an acid anhydride group-containing monomer, and the grafted amount thereof is 0.10 to 30 wt %.

According to another preferred embodiment of the adhesive composition of the present invention, the component (A) is a polyolefin graft-modified with an esterified product of an alkyl alcohol having 8 to 18 carbon atoms with (meth)acrylic acid, and the grafted amount thereof is 0.10 to 20 wt %.

According to another preferred embodiment of the adhesive composition of the present invention, the component (A) has a weight average molecular weight of 15,000 to 200,000.

According to another aspect of the present invention, there is provided a heat-fusible member comprising an adhesive layer formed by curing the adhesive composition of the present invention; a metal layer bonded to one side of the adhesive layer; and a heat-fusible resin layer bonded to the other side of the adhesive layer.

According to still another aspect of the present invention, there is provided a packaging material for a lithium ion battery, comprising the heat-fusible member of the present invention.

Advantageous Effects of Invention

According to the present invention, there are obtained an adhesive composition which is high in room-temperature peel strength and hot peel strength, and thus is excellent in adhesiveness, and also excellent in electrolyte resistance even when used for packaging materials for lithium ion batteries, as well as a heat-fusible member using the adhesive composition.

DESCRIPTION OF EMBODIMENTS

Figure 1:
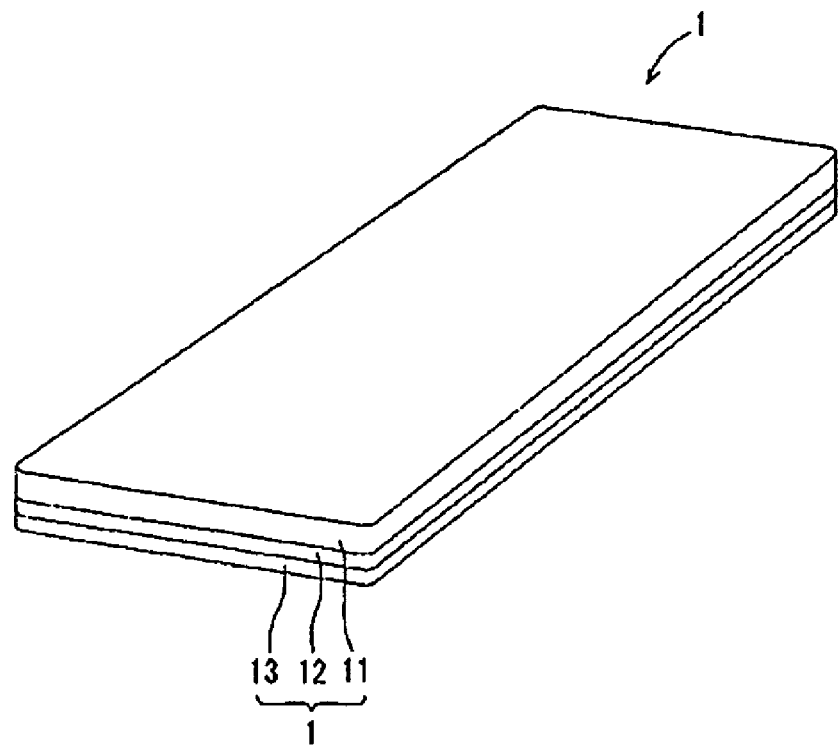
FIG. 1 is a schematic perspective view showing one example of the heat-fusible member of the present invention.

The present invention relates to an adhesive composition containing an organic solvent, a polyolefin (A) that has an acidic group and/or an acid anhydride group and is soluble in the organic solvent, and an isocyanate compound, wherein the isocyanate compound comprises a diisocyanate compound (B) having a hydrocarbon group with 4 to 7 carbon atoms and/or a derivative thereof, and a diisocyanate compound (C) having a hydrocarbon group with 8 to 14 carbon atoms and/or a derivative thereof.

Hereinafter, the component (A), the component (B), the component (C), the organic solvent, other components, the adhesive composition, a method for producing the adhesive composition, the heat-fusible member, a method for producing the heat-fusible member, and the application thereof will be described.

In addition, in the present specification, acrylic acid and/or methacrylic acid are described as (meth)acrylic acid.

1. Component (A)

The component (A) is a polyolefin having an acidic group and/or an acid anhydride group.

As the component (A), a polyolefin modified with an acidic group-containing monomer and/or an acid anhydride group-containing monomer is preferable from the viewpoint that the room-temperature peel strength and the hot peel strength are high.

As the component (A), a polyolefin modified with (meth)acrylic acid ester is further preferable from the viewpoint that solubility in organic solvents and compatibility with other resins are excellent.

Specific examples of constituent monomer units constituting the polyolefin of the component (A) include ethylene, propylene, and α-olefins such as 1-butene, isobutylene, 1-hexene and 1-octene. Among them, ethylene, propylene and 1-butene are preferable from the viewpoint that the hot peel strength and the electrolyte resistance can be improved when a nonpolar polyolefin resin poor in adhesiveness such as crystalline polyethylene and polypropylene is used as an adherend.

Specific examples of the acidic group include a carboxylic acid group, a sulfonic acid group and a phosphoric acid group; and among them, the carboxylic acid group is preferable from the viewpoint that the modification is easy.

Specific examples of the acid anhydride group include a carboxylic acid anhydride group, a sulfonic acid anhydride group and a phosphoric acid anhydride group; and among them, the carboxylic acid anhydride group is preferable from the viewpoint that the raw material is easily available and that the modification is easy.

As for the modification method, a known method can be employed. The examples of the method include graft modification which allows an acidic group-containing monomer and/or an acid anhydride group-containing monomer to addition-react with a polyolefin in the presence of a known radical polymerization initiator such as an organic peroxide or an aliphatic azo compound, in a state of being melt-kneaded or in an organic solvent; and copolymerization of an acidic group-containing monomer and/or an acid anhydride group-containing monomer with olefins.

The component (A) may further be graft-modified with an alkyl (meth)acrylate; and as the alkyl (meth)acrylate, an esterified product of an alkyl alcohol having 8 to 18 carbon atoms with (meth)acrylic acid (hereinafter referred to as "long chain alkyl (meth)acrylate") is preferable.

When the component (A) is a polyolefin graft-modified with an acidic group-containing monomer, an acid anhydride group-containing monomer and a long chain alkyl (meth)acrylate, the polyolefin as a raw material includes polyethylene, polypropylene, a random copolymer of propylene and ethylene, a block copolymer of propylene and ethylene, a random copolymer of ethylene and an α-olefin, a block copolymer of ethylene and an α-olefin, a random copolymer of propylene and an α-olefin, and a block copolymer of propylene and an α-olefin.

Among them, polypropylene-based polymers such as a propylene-ethylene copolymer, a propylene-1-butene copolymer and a propylene-ethylene-1-butene copolymer are preferable from the viewpoint that the hot peel strength and the electrolyte resistance can be improved when a nonpolar polyolefin resin poor in adhesiveness such as crystalline polyethylene and polypropylene is used as an adherend. Furthermore, it is particularly preferable that the propylene unit constitutes 50 wt % or more of the polyolefin.

In order to improve a graft amount of the acidic group-containing monomer, the acid anhydride group-containing monomer and the long chain alkyl (meth)acrylate in the component (A), it is preferable to use an organic peroxide such as benzoyl peroxide, dicumyl peroxide, lauroyl peroxide, di-t-butyl peroxide, 2,5-dimethyl-2,5-di(t-butylperoxy)

hexane and cumene hydroperoxide, or it is possible to use a reaction aid and a stabilizer for adjusting the stability of the resin.

Specific examples of the reaction aid include styrene, o-methylstyrene, p-methylstyrene, α-methylstyrene, divinylbenzene, hexadiene and dicyclopentadiene.

Specific examples of the stabilizer include hydroquinone, benzoquinone and a nitrosophenyl hydroxy compound.

1-1. Acidic Group-Containing Monomer

The acidic group-containing monomer as a raw material of the component (A) is a compound having an ethylenic double bond and a carboxylic acid group or the like in the same molecule; and includes various unsaturated monocarboxylic acid compounds, unsaturated dicarboxylic acid compounds, and unsaturated tricarboxylic acid compounds.

Specific examples of the unsaturated monocarboxylic acid compounds include acrylic acid, methacrylic acid, crotonic acid and isocrotonic acid.

Specific examples of the unsaturated dicarboxylic acid compounds include maleic acid, itaconic acid, citraconic acid, tetrahydrophthalic acid, nadic acid and endic acid.

Examples of the unsaturated tricarboxylic acid compounds include aconitic acid.

As the acidic group-containing monomer, the unsaturated dicarboxylic acid compound and the unsaturated tricarboxylic acid compound are preferable, and itaconic acid, maleic acid and aconitic acid are particularly preferable, from the viewpoint that the modification therewith is easy, and the adhesion becomes excellent.

These acidic group-containing monomers may be used alone, or two or more thereof may be used in combination.

When a part of the acidic group-containing monomer used for modification remains unreacted, the part may be removed by a known method such as distillation by heating and reprecipitation purification, as needed.

When the component (A) is a polyolefin graft-modified with an acidic group-containing monomer, the graft amount is preferably 0.10 to 30 wt % based on the graft-modified product. The graft amount is preferably 0.10 wt % or more and more preferably 0.50 wt % or more, from the viewpoint that the solubility in a solvent and the adhesion to a material such as a metal adherend can be kept. In addition, the graft amount is preferably 30 wt % or less, more preferably 20 wt % or less, and particularly preferably 10 wt % or less, from the viewpoint that sufficient adhesion can be obtained.

The graft amount of the acidic group-containing monomer can be measured by a known method. For example, the graft amount can be determined by alkalimetry or Fourier transform infrared spectroscopy.

1-2. Acid Anhydride Group-Containing Monomer

The acid anhydride group-containing monomer as a raw material of the component (A) is a compound having an ethylenic double bond and a carboxylic acid anhydride group or the like in the same molecule; and includes acid anhydrides of the above unsaturated monocarboxylic acid compound, acid anhydrides of the above unsaturated dicarboxylic acid compound, and acid anhydrides of the above unsaturated tricarboxylic acid compound.

Specific examples of the acid anhydrides of the unsaturated monocarboxylic acid compound include acrylic anhydride, methacrylic anhydride, crotonic anhydride and isocrotonic anhydride.

Specific examples of the acid anhydrides of the unsaturated dicarboxylic acid compound include maleic anhydride, itaconic anhydride, citraconic anhydride, tetrahydrophthalic anhydride, nadic anhydride and endic anhydride.

Specific examples of the acid anhydrides of the unsaturated tricarboxylic acid compound include aconitic anhydride.

As the acid anhydride group-containing monomer, the acid anhydrides of the unsaturated dicarboxylic acid compound and the acid anhydrides of the unsaturated tricarboxylic acid compound are preferable, and itaconic anhydride, maleic anhydride and aconitic anhydride are particularly preferable, from the viewpoint that the modification therewith is easy, and the adhesion becomes excellent.

These acid anhydride group-containing monomers may be used alone, or two or more thereof may be used in combination.

When a part of the acid anhydride group-containing monomer used for modification remains unreacted, the part may be removed by a known method such as distillation by heating and reprecipitation purification, as needed.

When the component (A) is a polyolefin graft-modified with an acid anhydride group-containing monomer, the graft amount is preferably 0.10 to 30 wt % based on the graft-modified product. The graft amount is preferably 0.10 wt % or more and more preferably 0.50 wt % or more, from the viewpoint that the solubility in a solvent and the adhesion to a material such as a metal adherend can be kept. In addition, the graft amount is preferably 30 wt % or less, more preferably 20 wt % or less, and particularly preferably 10 wt % or less, from the viewpoint that sufficient adhesion can be obtained.

The graft amount of the acid anhydride group-containing monomer can be measured by a known method. For example, the graft amount can be determined by alkalimetry or Fourier transform infrared spectroscopy.

1-3. Long Chain Alkyl(Meth)acrylate

Specific examples of the long chain alkyl (meth)acrylate as a raw material of the component (A) include octyl(meth)acrylate, lauryl (meth)acrylate, tridecyl(meth)acrylate and stearyl (meth)acrylate; and octyl(meth)acrylate, lauryl (meth)acrylate and tridecyl(meth)acrylate are preferable from the viewpoint that adhesion can be improved when a nonpolar polyolefin resin poor in adhesiveness is used as an adherend.

The graft amount of the long chain alkyl (meth)acrylate in the component (A) is preferably 0.10 to 20 wt % based on the graft-modified product. The graft amount is preferably 0.10 wt % or more, from the viewpoint that the solubility of the component (A) in the solvent, the compatibility with other resins, and the adhesion can be kept good. In addition, the graft amount is preferably 20 wt % or less, more preferably 10 wt % or less, and particularly preferably 5.0 wt % or less, from the viewpoint that the adhesion can be kept good.

The graft amount of the above long chain alkyl (meth)acrylate can be measured by a known method. For example, the graft amount can be determined by Fourier transform infrared spectroscopy or a $^1$H-NMR method.

In the present invention, monomers other than the above acidic group-containing monomer, the above acid anhydride group-containing monomer and the above long chain alkyl (meth)acrylate, (hereinafter referred to as "other monomers"), can be used in combination, according to the purpose, to an extent that does not impair the characteristics of the present invention.

Specific examples of the other monomers include (meth) acrylic acid esters other than described above, such as hydroxyethyl (meth)acrylate, benzyl (meth)acrylate, glycidyl (meth)acrylate and isocyanate-containing (meth) acrylic acid; and unsaturated monomers that can copolymerize with olefins such as styrene, cyclohexyl vinyl ether and dicyclopentadiene.

The use in combination with other monomers makes it possible to further improve the adhesion, the solubility in solvents, and the graft amounts of the acidic group-containing monomer, the acid anhydride group-containing monomer and the long chain alkyl (meth)acrylate. Desirably, the amount of the other monomers to be used does not exceed a total graft amount of the acidic group-containing monomer, the acid anhydride group-containing monomer and the long chain alkyl (meth)acrylate.

The component (A) may be a polyolefin having an acidic group and/or an acid anhydride group, and an ethylenic unsaturated group, according to the purpose, to an extent that does not impair the characteristics of the present invention.

Examples of a method of introducing an ethylenic unsaturated group into the component (A) include a method in which a hydroxyl group-containing ethylenic unsaturated monomer such as hydroxyl ethyl (meth)acrylate and an epoxy group-containing ethylenic unsaturated monomer such as glycidyl (meth)acrylate is added to the acidic group and/or the acid anhydride group.

The weight average molecular weight of the component (A) is preferably 15,000 to 200,000. The weight average molecular weight is preferably 15,000 or more, and more preferably 30,000 or more, from the viewpoint that room-temperature peel strength and electrolyte resistance can be improved. In addition, the weight average molecular weight is preferably 200,000 or less, and more preferably 150,000 or less, from the viewpoint that the solubility in an organic solvent in the adhesive composition can be improved.

In the present invention, the weight average molecular weight is a value obtained by converting a molecular weight measured by gel permeation chromatography into a polystyrene equivalent.

The melting point of the component (A) is preferably 50 to 100° C. The melting point is preferably 50° C. or higher, and more preferably 60° C. or higher, from the viewpoint that a sufficient peeling strength can be obtained. In addition, the melting point is preferably 100° C. or lower, and more preferably 95° C. or lower, from the viewpoint that sufficient storage stability at low temperature can be obtained.

As for the adhesive composition of the present invention, the components (A) may be used alone, or two or more thereof may be used in combination.

The content of the component (A) is preferably 80 to 100 wt % and more preferably 90 to 100 wt % based on 100 wt % of the solid content of the adhesive composition, from the viewpoint that the hot peel strength and the electrolyte resistance are excellent.

2. Isocyanate Compound

As the isocyanate compound of the present invention, a diisocyanate compound (B) having a hydrocarbon group with 4 to 7 carbon atoms and/or a derivative thereof, and a diisocyanate compound (C) having a hydrocarbon group with 8 to 14 carbon atoms and/or a derivative thereof are used in combination.

The component (B) has an effect of improving the adhesion to the adherend; and the component (C) is highly compatible with the component (A), and accordingly is high in the action of increasing a crosslinking density of cured products, and has an effect of improving the hot peel strength.

2-1. Component (B)

The component (B) is a diisocyanate compound having a hydrocarbon group with 4 to 7 carbon atoms (hereinafter referred to as "component (b)") and/or a derivative thereof.

Specific examples of the component (b) include hexamethylene diisocyanate, pentamethylene diisocyanate, and tetramethylene diisocyanate; and as the component (b), hexamethylene diisocyanate is preferable from the viewpoint that the effect of improving the adhesion to the adherend is high.

As the derivative of the component (b), a compound which includes at least one bond selected from the group consisting of an isocyanurate bond, a biuret bond, a urethane bond and an allophanate bond is preferable, and a compound which includes an isocyanurate bond is particularly preferable from the viewpoint that the effect of improving the adhesion to an adherend is high, and the room-temperature peel strength and the electrolyte resistance can be improved.

The derivative of the component (b) may have a urea bond and/or a uretdione bond.

As the derivative of the component (b), commercially available products can be used.

The commercially available products of the compound having an isocyanurate bond include Duranate TPA-100 (manufactured by Asahi Kasei Corp.), Duranate MFA-75B (manufactured by Asahi Kasei Corp.), Duranate TUL-100 (manufactured by Asahi Kasei Corp.), Duranate TSA-100 (manufactured by Asahi Kasei Corp.), Coronate HX (manufactured by Tosoh Corporation), and Takenate D-170N (manufactured by Mitsui Chemicals, Inc.).

The commercially available products of the compound having a biuret bond include Duranate 24A-100 (manufactured by Asahi Kasei Corp.), Duranate 21S-75E (manufactured by Asahi Kasei Corp.), Takenate D-165NN (manufactured by Mitsui Chemicals, Inc.), and Desmodur N3200 (manufactured by Sumika Bayer Urethane Ltd.).

The commercially available products of the compound having a urethane bond include Duranate P301-75E (manufactured by Asahi Kasei Corp.) and Sumidur HT (manufactured by Sumika Bayer Urethane Ltd.), which are adducts of hexamethylene diisocyanate and trimethylolpropane.

The commercially available products of the compound having an allophanate bond include Desmodur XP2580 (manufactured by Sumika Bayer Urethane Ltd.).

2-2. Component (C)

The component (C) is a diisocyanate compound having a hydrocarbon group with 8 to 14 carbon atoms (hereinafter referred to as "component (c)") and/or a derivative thereof.

Specific examples of the component (c) include a diisocyanate compound having one secondary isocyanate group such as isophorone diisocyanate and norbornane diisocyanate; a diisocyanate compound having two secondary isocyanate groups such as 4,4'-methylenebis(cyclohexyl isocyanate); and a diisocyanate compound having no secondary isocyanate group such as dodecane diisocyanate and 1,3-bis (isocyanate methyl)cyclohexane.

As the component (c), the diisocyanate compound having at least one secondary isocyanate group is preferable, and among them, isophorone diisocyanate is particularly preferable, from the viewpoint that the effect of improving the electrolyte resistance is high.

As the derivative of the component (c), a compound which includes at least one bond selected from the group consisting of an isocyanurate bond, a biuret bond, a urethane bond and an allophanate bond is preferable, and a compound which includes an isocyanurate bond is particularly preferable, from the viewpoint that the effect of improving the hot peel strength is high.

The derivative of the component (c) may have a urea bond and/or a uretdione bond.

As the derivative of the component (c), commercially available products can be used.

The commercially available products of the compound having an isocyanurate bond include Desmodur Z4470 BA (manufactured by Sumika Bayer Urethane Ltd.) and Duranate T4900-70B (manufactured by Asahi Kasei Corp.).

The commercially available products of the compound having an allophanate bond include Desmodur XP2565 (manufactured by Sumika Bayer Urethane Ltd.).

The commercially available products of the compound having a urethane bond include Takenate D-140N (manufactured by Mitsui Chemicals, Inc.) which is an adduct of isophorone diisocyanate with trimethylolpropane, and VESTANAT EP-DC1241 (manufactured by Evonik Japan Co., Ltd.) which is a monoadduct of isophorone diisocyanate with hydroxyethyl acrylate.

Weight ratio of the component (A) to the isocyanate compound in the adhesive composition of the present invention is not particularly limited, and the equivalent ratio (NCO/COOH) of isocyanate groups in the isocyanate compound to carboxylic acid groups in the component (A) is preferably 0.01 to 12.0. The equivalent ratio is preferably 0.01 or more, more preferably 0.04 or more, and particularly preferably 0.1 or more, from the viewpoint that excellent initial adhesion can be provided. In addition, the equivalent ratio is preferably 12.0 or less, and more preferably 9.0 or less, from the viewpoint that a cured product which has a sufficient crosslinking density and is excellent in flexibility and the like can be formed.

As for the weight ratio of the component (B) and the component (C) in the adhesive composition of the present invention, when the total amount of the component (B) and the component (C) is determined to be 100 wt %, the proportion of the component (B) is preferably 10 to 80 wt % and more preferably 20 to 50 wt %, from the viewpoint that the adhesion to the adherend can be improved; and the proportion of the component (C) is preferably 20 to 90 wt %, and more preferably 50 to 80 wt %, from the viewpoint that the action of increasing the crosslinking density of the cured product is high, and the hot peel strength can be improved.

3. Organic Solvent

In the adhesive composition of the present invention, an organic solvent is blended for the purpose of dissolving the component (A).

Specific examples of the organic solvent include aromatic organic solvents such as toluene and xylene; aliphatic organic solvents such as n-hexane; alicyclic organic solvents such as cyclohexane, methylcyclohexane and ethylcyclohexane; ketone-based organic solvents such as acetone and methyl ethyl ketone; alcohol-based organic solvents such as methanol and ethanol; ester-based organic solvents such as ethyl acetate and butyl acetate; and propylene glycol ether organic solvents such as propylene glycol methyl ether, propylene glycol ethyl ether and propylene glycol-t-butyl ether.

In the adhesive composition of the present invention, the organic solvents may be used alone, or two or more thereof may be used in combination.

As the organic solvents, organic solvents which can be easily volatilized and removed by, for example, heating the adhesive composition are preferable, and it is particularly preferable to use a mixed solvent of an alicyclic organic solvent and an ester-based or ketone-based organic solvent. In addition, it is preferable not to use any aromatic organic solvent, from the viewpoint of the solubility of the component (A) and environmental problems.

In the adhesive composition of the present invention, weight ratio of the organic solvent to the component (A) is not particularly limited, and the weight ratio can be set according to types or the like of the organic solvent and the modified polyolefin resin.

Content of the component (A) is preferably 5 to 25 wt %, and particularly preferably 10 to 20 wt %, when the total of the organic solvent and the component (A) is determined to be 100 wt %. In the case of such a content, the adhesive composition is easily applied to the adherend and is excellent in workability.

4. Other Components

The adhesive composition of the present invention contains an organic solvent and the above components (A) to (C), but various components can be blended according to the purpose.

Specific examples of the other components include a curing catalyst, a styrenic thermoplastic elastomer, a tackifier, an antioxidant, a hindered amine-based light stabilizer, an ultraviolet absorber, an antistatic agent, a flame retardant, a colorant, a dispersant, an adhesion-imparting agent, an antifoaming agent, a leveling agent, a plasticizer, a lubricant and a filler.

These components will be described below.

Meanwhile, as for the other components described later, only one of the exemplifying compounds may be used, or two or more thereof may be used in combination.

4-1. Curing Catalyst

The curing catalyst can be blended for the purpose of promoting a crosslinking reaction between the component (A) and the isocyanate compound, and acquiring an excellent adhesion performance.

It is preferable that the adhesive composition of the present invention further comprises the curing catalyst, from the viewpoint of easiness of curing and adhesion performance; and as the curing catalyst, an organotin compound, a tertiary amine and the like are preferable.

Specific examples of the organotin compound include dialkyltin fatty acids having an alkyl group with 3 to 10 carbon atoms, such as dibutyltin dilaurate, dibutyltin dimaleate, dioctyltin dilaurate and dioctyltin dimaleate.

Specific examples of the tertiary amine include tetraalkylethylene diamine such as tetramethylethylene diamine; N,N'-dialkylbenzylamine such as dimethylbenzylamine; and triethylenediamine, pentamethyl diethylene triamine, N-ethyl morpholine, N-methyl morpholine, 1-methyl-4-dimethylamine ethyl piperazine and diazabicycloundecene.

As the curing catalyst, an organotin compound and a tertiary amine can be used in combination.

The content ratio of the curing catalyst is preferably 0.001 to 5 parts by weight per 100 parts by weight of the total amount of the components (A) to (C). Due to the ratio of the curing catalyst being controlled to 0.001 parts by weight or more, a sufficient catalytic effect is easily obtained, and due to the ratio of the curing catalyst being controlled to 5 parts by weight or less, storage stability of the adhesive composition can be ensured.

4-2. Styrenic Thermoplastic Elastomer

The styrenic thermoplastic elastomer can be blended for the purpose of improving adhesive strength.

Specific examples of the styrenic thermoplastic elastomers include styrenic resins such as a styrene-butadiene copolymer, an epoxy-modified styrene-butadiene copolymer, a styrene-butadiene-styrene block copolymer, a styrene-ethylene/propylene-styrene block copolymer (hereinafter referred to as "SEPS"), a styrene-ethylene/butylene-styrene block copolymer (hereinafter referred to as "SEBS"), a styrene-isoprene/butadiene-styrene block copolymer, and a styrene-isoprene-styrene block copolymer; and these may have neither acidic group nor acid anhydride group or may have an acidic group and/or an acid anhydride group, or may have an amino group.

As a modification method for introducing the acidic group and/or the acid anhydride group, a known method can be employed. Examples of the method include graft modification such as melt-kneading the above acidic group-containing monomer and/or the above acid anhydride group-containing monomer with the above styrenic resin in the presence of a radical polymerization initiator such as an organic peroxide or an aliphatic azo compound.

As a modification method for introducing an amino group, a known method can be employed. Examples of the method include a terminal modification such as adding an amino group-containing compound to a living terminal of the above styrenic resin obtained by living anionic polymerization; and graft modification such as melt-kneading an amine compound having an unsaturated bond such as 2-(1-cyclohexenyl)ethylamine with the above styrenic resin in the presence of a radical polymerization initiator such as an organic peroxide or an aliphatic azo compound.

Among these, SEPS and SEBS are preferable from the viewpoint that adhesive strength can be improved.

4-3. Tackifier

The tackifier can be blended for the purpose of improving adhesive strength.

As the tackifier, known ones can be used; and examples thereof include a polyterpenic resin, a rosin-based resin, an aliphatic petroleum resin, an alicyclic petroleum resin, a copolymer-based petroleum resin and a hydrogenated petroleum resin.

Specific examples of the polyterpenic resin include an α-pinene polymer, a β-pinene polymer, and copolymers of these polymers with phenol, bisphenol A or the like.

Specific examples of the rosin-based resin include natural rosin, polymerized rosin, and ester derivatives thereof.

A specific example of the aliphatic petroleum resin is a resin often called a C5 resin which is generally synthesized from the C5 fraction of petroleum. The alicyclic petroleum resin is a resin often called a C9 resin which is generally synthesized from the C9 fraction of petroleum.

A specific example of the copolymer petroleum resin is a C5/C9 copolymer resin or the like.

The hydrogenated petroleum resins are resins generally produced by hydrogenation of the above various petroleum resins.

The content of the tackifier is preferably 1 to 20 wt %, and more preferably 1 to 10 wt % per 100 wt % of the adhesive composition from the viewpoint that hot water resistance is excellent.

5. Adhesive Composition

The adhesive composition of the present invention contains an organic solvent and the above components (A) to (C) as essential components.

The viscosity at 25° C. of the adhesive composition of the present invention is preferably 10 to 5,000 mPa·s. The viscosity is preferably 10 mPa·s or higher from the viewpoint that coatability is excellent. In addition, the viscosity is preferably 5,000 mPa·s or lower, and more preferably is 1,000 mPa·s or lower from the viewpoint that leveling properties are excellent.

The adhesive composition of the present invention is suitable for adhesion between a polyolefin resin molded article and another member (a metal member, a resin member and the like), and can be used in not only an adhesion of polyolefin resin molded articles such as polyolefin resin films with each other, but also an adhesion between a polyolefin resin film and a metal foil made from aluminum or the like, an adhesion between a polyolefin resin film and a metal layer of a composite film having a resin layer and the metal layer, and the like. An adhesive layer obtained from the adhesive composition of the present invention can be preferably used for packaging materials for lithium ion batteries, because it is high in room-temperature peel strength and hot peel strength and thus excellent in adhesiveness, and besides has a high electrolyte resistance.

6. Method for Producing Adhesive Composition

The adhesive composition of the present invention can be produced by a known method.

The specific method includes a method in which a solution of the component (A) in an organic solvent is mixed with the other components excluding the isocyanate compound, and then the obtained mixture is mixed with the isocyanate compound. A temperature at the time of mixing is usually 40° C. or lower, and preferably 10° C. to 30° C.

7. Heat-Fusible Member

The heat-fusible member of the present invention includes an adhesive layer resulting from curing the adhesive composition of the present invention; a metal layer bonded to one side of the adhesive layer; and a heat-fusible resin layer bonded to the other side of the adhesive layer.

Figure 2:
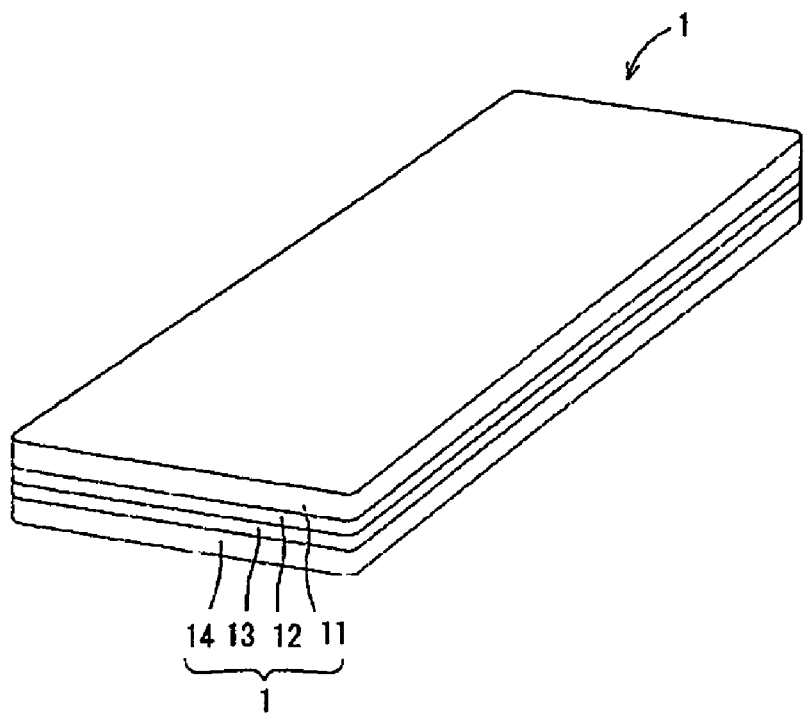
FIG. 2 is a schematic perspective view showing another example of the heat-fusible member of the present invention.

A schematic view of the heat-fusible member of the present invention is shown in FIG. 1 and FIG. 2. Specifically, a heat-fusible member 1 in FIG. 1 comprises a heat-fusible resin layer 11, an adhesive layer 12 and a metal layer 13 in this order. In addition, a heat-fusible member 1 in FIG. 2 comprises a heat-fusible resin layer 11, an adhesive layer 12, a metal layer 13 and another layer 14 in this order.

The shape of the heat-fusible member of the present invention may be appropriately set according to the use and the like, and is not particularly limited, but includes a shape of film, sheet, plate, angle or rod.

The above heat-fusible resin layer is a layer containing a resin that can melt by heat to fuse a material constituting a layer on one side to a material constituting a layer on the other side. The heat-fusible resin layer is a layer containing a resin which melts preferably at a temperature of 50° C. to 200° C. Resins having such properties include a polyolefin resin, a polyamide resin and a polyester resin. Among these, the polyolefin resin is preferable from the viewpoint that heat fusing with sufficient strength is possible. Furthermore, polypropylene is preferable as the polyolefin resin. In particular, unstretched polypropylene is more preferable from the viewpoint that dimensional change (shrinkage) is small when the heat-fusible member is used to integrate another member therewith.

The above heat-fusible resin layer may be a layer containing an additive such as a lubricant, a filler, a heat stabilizer, an antioxidant, an ultraviolet absorber, an antistatic agent, a flame retardant, a colorant, a dispersant and an adhesion-imparting agent, as needed.

Thickness of the above heat-fusible resin layer changes depending on the material of the resin and the like, and is not particularly limited; but for example, in the case of the layer containing the unstretched polypropylene, is preferably 10 to 200 µm and more preferably 20 to 100 µm. When the thickness of the layer containing the unstretched polypropylene is 10 to 200 µm, a heat-fused composite product such as a hermetically sealed container can be obtained, which is not easily damaged and shows high durability.

The above adhesive layer is a layer formed by curing the adhesive composition of the present invention. Thickness of the adhesive layer is not particularly limited, but is preferably 1 to 20 µm and particularly preferably 2 to 10 µm. If the thickness of the adhesive layer is 1 to 20 µm, processing such as bending is easy when the heat-fusible member in a shape of sheet, for example.

The above metal layer is a layer containing a metal or alloy. The metal or alloy includes aluminum, iron, titanium, magnesium, copper, nickel, chromium and other metals; and alloys thereof. Among these, aluminum is preferable because workability is excellent. Thickness of the metal layer changes depending on the material and the like, but is not particularly limited. When the metal layer is made from, for example, aluminum, the thickness is preferably 20 to 100 µm, particularly preferably 20 to 80 µm and further preferably 30 to 60 µm.

When the heat-fusible member of the present invention has the metal layer, another layer 14 can be provided on the surface of the metal layer 13, as is shown in FIG. 2. The material constituting the above another layer preferably includes a resin, from the viewpoint of protecting the metal layer. Specifically, the above another layer is preferably a resin layer. This resin is not particularly limited, and can be a polyamide resin, a polyester resin or the like. Transparency of the resin layer is not particularly limited, but if this resin layer is transparent or translucent, an excellent appearance can be obtained when the heat-fusible member is made into a hermetically sealed container or the like as a heat fused composite product. Thickness of the above another layer is not particularly limited; but is preferably 30 to 60 µm and particularly preferably 30 to 50 µm.

The heat-fusible member with the use of the adhesive composition of the present invention has high room-temperature peel strength and high hot peel strength, and thus has excellent adhesiveness, as well as excellent resistance to a solvent such as an electrolytic solution; and accordingly can prevent the deterioration of the content while maintaining the structure.

In the case of use as packaging materials for lithium ion batteries, the adhesiveness and the like can be kept against a temperature change during battery storage or in a usage environment, particularly, in a chemical temperature rise of materials constituting the battery associated with charging or discharging, in summer, or in a temperature range higher than room temperature in automobiles or the like.

8. Method for Producing Heat-Fusible Member

A method for producing the heat-fusible member shown in FIG. 1 is as follows.

(1) A method comprises applying the adhesive composition to a surface of a metal foil, a metal film or the like that forms the metal layer 13; then removing the organic solvent contained in the composition to form the adhesive layer 12; and subsequently bringing the surface of the thus-formed adhesive layer 12 into contact with a resin film that forms the heat-fusible resin layer 11 (hereinafter referred to as "heat-fusible resin film") and pressure-bonding them under heating.

(2) A method comprises applying the adhesive composition to the surface of the heat-fusible resin film; then removing the organic solvent contained in the composition to form the adhesive layer 12; and subsequently bringing the surface of the thus-formed adhesive layer 12 into contact with a metal foil or the like that forms the metal layer 13 and pressure-bonding them under heating.

In addition, the method for producing the heat-fusible member shown in FIG. 2 is as follows.

(3) A method comprises applying the adhesive composition to the surface of the metal layer 13 of a composite film that is constituted by a resin layer forming the above another layer 14 and the metal layer 13 formed on one side of the resin layer by vapor deposition or the like; then removing an organic solvent contained in the composition to form the adhesive layer 12; and subsequently bringing the surface of the thus-formed adhesive layer 12 into contact with the heat-fusible resin film and pressure-bonding them under heating.

(4) A method comprises applying the adhesive composition to the surface of the heat-fusible resin film; then removing an organic solvent contained in the composition to form the adhesive layer 12; and subsequently bringing the surface of the thus-formed adhesive layer 12 into contact with the surface of the metal layer 13 of a composite film that is constituted by a resin layer forming the above another layer 14 and the metal layer 13 formed on one side of the resin layer by vapor deposition or the like and pressure-bonding them by heating.

(5) A method comprises extrusion-molding a film forming the above another layer 14 on the surface of the metal layer 13 of the layered product obtained by the above method (1) or (2).

The adhesive composition is in many cases applied to a material for forming a metal layer such as a metal foil, or a surface of a metal layer of a composite film which has a metal layer and another layer (resin layer), but the object to which it is applied is not particularly limited. When a metal foil is used, it is preferable to use an aluminum foil having a thickness of 20 to 100 µm. Thereby, a heat-fusible member which is inhibited from breakage can be easily formed. In addition, when a composite film is used, it is preferable that a metal layer comprises aluminum, and another layer (resin layer) comprises a polyamide resin, a polyester resin or the like. Furthermore, when the heat-fusible member shown in FIG. 2 is produced without using a composite film, in other words, when the above method (5) is employed, it is preferable to use a film comprising a polyamide resin, a polyester resin or the like, as a film for forming the another layer 14.

As the heat-fusible resin film, can be used a polyolefin resin film, a polyamide resin film and a polyester resin film, for example. These resin films can be films obtained by film forming methods such as an extrusion method, a cast molding method, a T-die method and an inflation method. Thickness of the heat-fusible resin film is usually 10 to 200 μm. In the present invention, a polyolefin resin film is preferable from the viewpoint that heat fusion for completing a heat-fusible member and heat fusion at the time of producing a heat fused composite product can be easily performed; and an unstretched polypropylene film is particularly preferable from the viewpoint that a heat fused composite product such as a hermetically sealing container which is difficult to be damaged and is excellent in durability can be obtained. When this unstretched polypropylene film is used, the thickness is preferably 10 to 200 μm, and more preferably 20 to 100 μm.

The adhesive composition can be applied by a known method, and can be applied with the use of a bar coater, a gravure coater or the like, for example. Thickness and drying temperature of the coated film are not particularly limited. The drying temperature of the coated film is not particularly limited, but is preferably 30° C. to 100° C. from the viewpoint of workability.

As described above, the dried coated film generally has tackiness and adhesiveness and thus can bond two members without heating. But the heat-fusible member of the present invention may be produced by adopting, for example, a method using pressure-bonding or the like of the two members while heating to a temperature taking into account of the melting point, melt viscosity and the like of the resin component based on the modified polyolefin resin. As for heating conditions and pressure-bonding conditions, for example, the temperature is 180° C., the pressure is 0.3 MPa, and a time period of the pressure bonding is 2 seconds.

In addition, conditions for promoting a crosslinking reaction between the component (A) and the isocyanate compound to complete the heat-fusible member (hereinafter referred to as "aging conditions") are not particularly limited; and it is preferable to set the conditions according to the material of the metal foil, the material, the melting temperature and the like of the heat-fusible resin film, and the composition and the like of the adhesive layer. As for aging conditions, heating may be performed at 40° C. for about 3 to 7 days, and a polyolefin having an acidic group and/or an acid anhydride group and an ethylenic unsaturated group may be used as the component (A) to perform curing by active energy rays such as ultraviolet rays and electron beams in combination with heating, in order to shorten the aging time.

9. Application

The heat-fusible member of the present invention can be used in various fields of industrial products such as electric fields, automotive fields, industrial fields and other fields.

As for examples of the applications to electric fields, there are packaging materials for secondary batteries such as lithium ion batteries and lithium ion polymer batteries; decoration by attaching decorative sheets in mobile devices, housings of television sets, housings of household appliances and the like; bonding between a metal member and a resin; sealing of an electronic component; and the like.

As for examples of the applications to automotive fields, there are adhesion of an exterior material formed of a metal member/resin in interior/exterior members such as a pillar, a braid, a door trim, a spoiler and a roof; and adhesion of a base material with genuine leather, fabrics, an instrument panel foamed sheet and a decorative sheet.

As for an example of the application to industrial fields, there is adhesion between films of a multilayer film such as an industrial packaging material and a barrier film.

Examples of the applications to other fields include adhesion of logistics materials, housing and building materials, household goods and sporting goods.

Among these applications, the packaging material for lithium ion battery is preferable as the application of the heat-fusible member of the present invention because it is high in room-temperature peel strength and hot peel strength, and thus excellent in adhesiveness, as well as high in electrolyte resistance.

EXAMPLES

The present invention will be described in more detail below, with reference to Examples and Comparative Examples.

1. Production Examples

1) Production Example 1 (Production of Component (A))

Into a twin screw extruder (L/D=42 and φ=58 mm), 100 parts by weight of a propylene-ethylene-1-butene copolymer (72 mol % of propylene component, 7 mol % of ethylene component and 21 mol % of 1-butene component, weight average molecular weight of 120,000, and Tm=100° C.), 2.3 parts by weight of maleic anhydride, 4 parts by weight of lauryl methacrylate, and 1.5 parts by weight of 2,5-dimethyl-2,5-di(t-butylperoxy)hexane were charged. The above materials were allowed to react for a residence time of 10 minutes and at barrel temperatures of 180° C. (in the first to seventh barrels), and the remaining unreacted maleic anhydride and lauryl methacrylate were removed by degassing in the seventh barrel to obtain a reaction product (hereinafter referred to as "component A1").

2) Production Example 2 (Production of Component (A))

In a four-neck flask equipped with a stirrer, a reflux condenser and a dripping funnel, 100 parts by weight of a propylene-ethylene copolymer (97 mol % of propylene component and 3 mol % of ethylene component, weight average molecular weight of 250,000, and Tm=125° C.) was dissolved in 400 parts by weight of toluene while being heated; then, 1 part by weight of dicumyl peroxide was added dropwise while the temperature in the system was maintained at 110° C. under stirring; and then, the mixture was subjected to degradation treatment for 1 hour. Next, 1.5 parts by weight of aconitic anhydride, 3 parts by weight of octyl acrylate, and 0.5 parts by weight of benzoyl peroxide were each added dropwise to the mixture over 3 hours, and the resultant mixture was allowed to react further for 1 hour. After the reaction, the reaction product was cooled to room temperature; then, the crude reaction product was poured into a large excess of acetone, and unreacted aconitic anhydride and octyl acrylate were removed to obtain a reaction product (hereinafter referred to as "component A2").

3) Production Example 3 (Production of Component (A))

Into a twin screw extruder similar to that in Production Example 1, 100 parts by weight of a propylene-ethylene-1-butene copolymer (68 mol % of propylene component, 8 mol % of ethylene component and 24 mol % of 1-butene component, weight average molecular weight of 50,000, and Tm=70° C.), 8 parts by weight of itaconic anhydride, 5 parts by weight of tridecyl acrylate, and 2 parts by weight of lauroyl peroxide were charged. The above materials were reacted for a residence time of 10 minutes and at barrel temperatures of 170° C. (in the first to seventh barrels), and the remaining unreacted itaconic anhydride and tridecyl acrylate were removed by degassing in the seventh barrel to obtain a reaction product (hereinafter referred to as "component A3").

2. Method for Evaluating Reaction Product

The reaction products A1 to A3 obtained in Production Examples 1 to 3, respectively, were subjected to measurements of a weight average molecular weight, a melting point, a graft amount of the acidic group-containing monomer and/or acid anhydride group-containing monomer, and a graft amount of the long chain alkyl (meth)acrylate, according to the methods described later.

The results are shown in Table 1.

(1) Weight Average Molecular Weight

Apparatus: HLC-8220GPC (manufactured by Tosoh Corporation)
Column: 2 TSKgel GMHXLs (manufactured by Tosoh Corporation)
Column temperature: 40° C.
Eluent: tetrahydrofuran 1.00 ml/min
Detector: RI
The molecular weight measured by GPC was converted on the basis of the molecular weight of polystyrene.

(2) Melting Point

In accordance with the provisions of JIS K 7121 (established in 1987), measurement was made at a rate of temperature increase of 10° C./min with the use of a differential scanning calorimeter, and a crystallization temperature was defined as the melting point (hereinafter "Tm").

(3) Graft Amount of Acid Anhydride Group-Containing Monomer

The graft amount of the acid anhydride group-containing monomer is defined by the following expression using the acid value obtained by the measurement described later.

$$\text{Graft amount (wt \%)} = \text{acid value} \times M \times 100/(1000 \times 56.1 \times V)$$

M=(molecular weight of acid anhydride group-containing monomer)+(number of unsaturated groups in acid anhydride group-containing monomer)×1.008 in the case of maleic anhydride, M=99.1
in the case of aconitic anhydride, M=157.1
in the case of itaconic anhydride, M=113.1
V=valence of acidic group when acid anhydride group-containing monomer is hydrolyzed
in the case of maleic anhydride, V=2
in the case of aconitic anhydride, V=3
in the case of itaconic anhydride, V=2

The graft amounts of the acid anhydride group-containing monomers in the above reaction products A1 to A3 were each calculated according to the following expressions.

$$\text{Graft amount of A1 (wt \%)} = \text{acid value} \times 99.1 \times 100/(1000 \times 56.1 \times 2)$$

$$\text{Graft amount of A2 (wt \%)} = \text{acid value} \times 157.1 \times 100/(1000 \times 56.1 \times 3)$$

$$\text{Graft amount of A3 (wt \%)} = \text{acid value} \times 113.1 \times 100/(1000 \times 56.1 \times 2)$$

Method for Measuring Acid Value

The acid value refers to the number of milligrams of potassium hydroxide required to neutralize an acid contained in 1 g of a sample, and was measured in accordance with JIS K 0070: 1992.

Specifically, a sample solution is obtained by accurately weighing 0.2 g of a sample to be measured in an Erlenmeyer flask with stopper, adding 20 ml of tetrahydrofuran thereto, and dissolving the sample while heating. Subsequently, several drops of a 1 w/v% phenolphthalein ethanol solution were added to this sample solution, as an indicator; the resultant solution was titrated with the use of a 0.1 mol/L potassium hydroxide ethanol solution as a titrant, until the mixture showed a pale red color continuously for 10 seconds; and the acid value was calculated according to the following expression.

$$\text{Acid value (mgKOH/g)} = (T \times F \times 56.1 \times 0.1)/W$$

Here, in the above expression, T represents a titer (mL), F represents a factor of the titrant, and W represents an amount (g) of a collected sample.

(4) Graft Amount of Long Chain Alkyl(Meth)Acrylate

First, the long chain alkyl (meth)acrylates (concentration (wt %): $C_1$, $C_2$ and $C_3$) which were raw materials of the above reaction products A1 to A3, respectively, were mixed with the polyolefins which were raw materials of the above reaction products A1 to A3 with the use of a twin-screw extruder similar to that in Production Example 1, and three types (thickness: 100 μm) of films were obtained with the use of a hot press, in which the concentrations of the long chain alkyl (meth)acrylates were different from each other.

Infrared absorption spectra of the above three types of films were measured by Fourier transform infrared spectroscopy, and absorbance ratios $Y_1$, $Y_2$ and $Y_3$ were determined according to the following expressions, and calibration curves for the concentrations $C_1$, $C_2$ and $C_3$ were prepared.

Absorbance ratio Y=(absorbance originating in stretching vibration of ester carbonyl(1730±10 $cm^{-1}$))/(absorbance originating in deformation vibration of C—H in $CH_3$ (1380±10 $cm^{-1}$))
$Y_1$: Y at the concentration of $C_1$
$Y_2$: Y at the concentration of $C_2$
$Y_3$: Y at the concentration of $C_3$ Next, infrared spectra of the above reaction products A1 to A3 were measured, and absorbance ratios $Y_{A1}$ (Y of the reaction product A1), $Y_{A2}$ (Y of the reaction product A2) and $Y_{A3}$ (Y of the reaction product A3) were determined; and graft amounts of the long chain alkyl (meth)acrylates of the reaction products A1 to A3 were calculated according to the following expressions on the basis of the above calibration curves.

Graft amount of $A1$ (wt %) = $(Y_{A1} - b)/a$

Graft amount of $A2$ (wt %) = $(Y_{A2} - b)/a$

Graft amount of $A3$ (wt %) = $(Y_{A3} - b)/a$ $P\ a = (3f - d \times e)/(3c - d^2)$ $b = (c \times e \times f \times d)/(3c - d^2)$ $c = C_1^2 + C_2^2 + C_3^2$ $d = C_1 + C_2 + C_3$ $e = Y_1 + Y_2 + Y_3$ $f = C_1 Y_1 + C_2 Y_2 + C_3 Y_3$

TABLE 1

| | | Weight average molecular weight | Melting point (° C.) | Graft amount (wt %) of acid anhydride group-containing monomer | Graft amount (wt %) of long chain alkyl (meth)acrylate |
|---|---|---|---|---|---|
| Production Example 1 | A1 | 92,000 | 90 | 1.8 | 3.6 |
| Production Example 2 | A2 | 82,000 | 80 | 1.2 | 2.8 |
| Production Example 3 | A3 | 36,000 | 60 | 7.5 | 4.6 |

3. Examples 1 to 14 and Comparative Examples 1 to 8

1) Preparation of Adhesive Compositions

Into a flask which had an internal volume of 300 ml and was equipped with a condenser and a stirrer, each of the components (A) shown in the following Table 2 and an organic solvent were charged, and each mixture was stirred at 60° C. for 10 minutes to obtain each solution. After the solution was cooled to room temperature, a reaction accelerator was added to the resultant solution, and the mixture was further mixed to obtain a liquid resin composition.

Next, each of the components (B) and/or each of the components (C), which are the isocyanate compounds shown in Table 2, were blended and mixed with the resin compositions at the respective ratios shown in Table 2 to obtain each of the adhesive compositions.

In addition, when the test pieces described later were produced, the adhesive composition was used within 1 hour after the isocyanate compound was blended.

The evaluations described later were performed with the use of the obtained adhesive compositions shown in Table 2. The results are shown in Table 2.

The numbers in Table 2 mean parts by weight.

In addition, abbreviations in Table 2 mean the followings.

DBTL: dibutyltin dilaurate, manufactured by ADEKA Corporation, ADK STAB BT-11

TPA100: isocyanurate body of hexamethylene diisocyanate (having a hydrocarbon group with 6 carbon atoms), Duranate TPA-100 manufactured by Asahi Kasei Corp.

N3200: biuret form of hexamethylene diisocyanate (having a hydrocarbon group with 6 carbon atoms), Desmodur N3200 manufactured by Sumika Bayer Urethane Ltd.

HT: adduct of hexamethylene diisocyanate (having a hydrocarbon group with 6 carbon atoms) and trimethylolpropane, Sumidur HT manufactured by Sumika Bayer Urethane Ltd.

XP2580: allophanate body of hexamethylene diisocyanate (having a hydrocarbon group with 6 carbon atoms), Desmodur XP2580 manufactured by Sumika Bayer Urethane Ltd.

HDI: hexamethylene diisocyanate (having a hydrocarbon group with 6 carbon atoms)

TMDI: tetramethylene diisocyanate (having a hydrocarbon group with 4 carbon atoms)

Z4470: isocyanurate body of isophorone diisocyanate (having a hydrocarbon group with 10 carbon atoms), Desmodur 24470 BA manufactured by Sumika Bayer Urethane Ltd.

XP2565: allophanate body of isophorone diisocyanate (having a hydrocarbon group with 10 carbon atoms), Desmodur XP2565 manufactured by Sumika Bayer Urethane Ltd.

D140N: adduct of isophorone diisocyanate (having a hydrocarbon group with 10 carbon atoms) and trimethylolpropane, Takenate D-140N manufactured by Mitsui Chemicals, Inc.

EPDC1241: monoadduct of isophorone diisocyanate (having a hydrocarbon group with 10 carbon atoms) and hydroxyethyl acrylate, VESTANAT EP-DC1241 manufactured by Evonik Japan Co., Ltd.

IPDI: isophorone diisocyanate (having a hydrocarbon group with 10 carbon atoms)

DDDI: dodecane diisocyanate (having a hydrocarbon group with 12 carbon atoms)

2) Evaluation of Liquidity of Adhesive Composition (1) Viscosity

The viscosity was measured with the use of a B-type rotational viscometer (manufactured by Toki Sangyo Co., Ltd.) under a condition of temperature of 25° C.±0.5° C.

3) Production of Test Piece

An adhesive composition was applied to an aluminum foil (size: 100 mm×200 mm, thickness: 40 µm, and surface treatment: chemical conversion treatment) with a bar coater, then dried at 80° C. for 60 seconds, and further dried at 180° C. for 20 seconds to remove the organic solvent contained in the adhesive composition; and thereby an adhesive layer having a film thickness of 4 µm was formed.

Next, a cast polypropylene film (thickness 80 µm, and hereinafter referred to as "CPP") was laminated to the surface of the adhesive layer, as a heat-fusible resin film, and was pressed from the surface of the aluminum foil to pressure-bond to each other, with the use of a thermal inclination tester. The bonding conditions at this time were set to be a temperature of 180° C., a pressure of 0.3 MPa, and a time period of pressure-bonding of 2 seconds.

After that, this integrated product was accommodated in a hot-air circulating oven adjusted to 40° C., for 3 days to obtain a test piece.

4) Evaluation of Test Piece

The evaluation described later was performed with the use of the test piece obtained in 3.3).

(1) Adhesion

Room-Temperature Peel Strength

The above test piece was cut into a width of 15 mm, and the room-temperature peel strength (at measurement temperature of 25° C.) between the aluminum foil and the CPP was measured by a T peel test (at tensile speed of 100 mm/min), and was evaluated according to the following three levels. The results are shown in Table 2.

◎: 20 N/15 mm or higher
○: 10 N/15 mm or higher, and lower than 20 N/15 mm
x: lower than 10 N/15 mm Hot Peel Strength The above test piece was cut into a width of 15 mm, and the hot peel strength (at measurement temperature of 80° C.) between the aluminum foil and the CPP was measured by a T peel test (at tensile speed of 100 mm/min), and was evaluated according to the following three levels. The results are shown in Table 2.

◎: 15 N/15 mm or higher
○: 10 N/15 mm or higher, and lower than 15 N/15 mm
x: lower than 10 N/15 mm

(2) Electrolyte Resistance

As the electrolytic solution, was used one prepared by mixing ethylene carbonate, diethyl carbonate and dimethyl carbonate at 1:1:1 (weight ratio), and adding thereto lithium hexafluorophosphate at a concentration of 1 mol/L.

After the above test piece was immersed in the electrolytic solution at 80° C. for 8 days, the room-temperature peel strength (at measurement temperature of 25° C.) between the aluminum foil and the CPP was measured by a T peel test (at tensile speed of 100 mm/min), and was evaluated according to the following three levels. The results are shown in Table 2.

◎: 15 N/15 mm or higher
○: 10 N/15 mm or higher, and lower than 15 N/15 mm
x: lower than 10 N/15 mm

| | | Example | | | | | | | |
|---|---|---|---|---|---|---|---|---|---|
| | | 1 | 2 | 3 | 4 | 5 | 6 | 7 | 8 |
| Component (A) | A1 | 15 | 15 | 15 | 15 | 15 | 15 | 15 | 15 |
| | A2 | | | | | | | | |
| | A3 | | | | | | | | |
| Organic solvent | Methyl-cyclohexane | 68 | 68 | 68 | 68 | 68 | 68 | 68 | 68 |
| | Methyl ethyl ketone | 17 | 17 | 17 | 17 | 17 | 17 | 17 | 17 |
| Curing catalyst | DBTL | 0.0015 | 0.0015 | 0.0015 | 0.0015 | 0.0015 | 0.0015 | 0.0015 | 0.0015 |
| Component (B) | TPA100 | 2.0 | | | | | | 2.0 | 2.0 |
| | N3200 | | 2.0 | | | | | | |
| | HT | | | 2.0 | | | | | |
| | XP2580 | | | | 2.0 | | | | |
| | HDI | | | | | 2.0 | | | |
| | TMDI | | | | | | 2.0 | | |
| Component (C) | Z4470 | 3.0 | 3.0 | 3.0 | 3.0 | 3.0 | 3.0 | | |
| | XP2565 | | | | | | | 3.0 | |
| | D140N | | | | | | | | 3.0 |
| | EPDC1241 | | | | | | | | |
| | IPDI | | | | | | | | |
| | DDDI | | | | | | | | |
| Liquidity | Viscosity mPa·s (25° C.) | 193 | 202 | 193 | 198 | 181 | 180 | 212 | 195 |
| Adhesion | Room-temperature peel strength N/15 mm (25° C.) | 24 | 23 | 24 | 22 | 22 | 21 | 22 | 21 |
| | Determination | ◎ | ◎ | ◎ | ◎ | ◎ | ◎ | ◎ | ◎ |
| | Hot peel strength N/15 mm (80° C.) | 15 | 14 | 15 | 13 | 17 | 17 | 15 | 13 |
| | Determination | ◎ | ○ | ◎ | ○ | ◎ | ◎ | ◎ | ○ |
| Electrolyte resistance | Peel strength after immersion N/15 mm (25° C.) | 17 | 13 | 13 | 14 | 13 | 12 | 13 | 13 |
| | Determination | ◎ | ○ | ○ | ○ | ○ | ○ | ○ | ○ |

| | | Example | | | | | | Comparative Example | |
|---|---|---|---|---|---|---|---|---|---|
| | | 9 | 10 | 11 | 12 | 13 | 14 | 1 | 2 |
| Component (A) | A1 | 15 | 15 | 15 | 15 | | | 15 | 15 |
| | A2 | | | | | 15 | | | |
| | A3 | | | | | | 15 | | |

-continued

| | | | | | | | | | |
|---|---|---|---|---|---|---|---|---|---|
| Organic solvent | Methylcyclohexane | 68 | 68 | 68 | 68 | 68 | 68 | 68 | 68 |
| | Methyl ethyl ketone | 17 | 17 | 17 | 17 | 17 | 17 | 17 | 17 |
| Curing catalyst | DBTL | 0.0015 | 0.0015 | 0.0015 | 0.0015 | 0.0015 | 0.0015 | 0.0015 | 0.0015 |
| Component (B) | TPA100 | 2.0 | 2.0 | 2.0 | 4.0 | 2.0 | 2.0 | 2.0 | |
| | N3200 | | | | | | | | |
| | HT | | | | | | | | |
| | XP2580 | | | | | | | | |
| | HDI | | | | | | | | 2.0 |
| | TMDI | | | | | | | | |
| Component (C) | Z4470 | | | | 6.0 | 3.0 | 3.0 | | |
| | XP2565 | | | | | | | | |
| | D140N | | | | | | | | |
| | EPDC1241 | 3.0 | | | | | | | |
| | IPDI | | 3.0 | | | | | | |
| | DDDI | | | 3.0 | | | | | |
| Liquidity | Viscosity mPa·s (25° C.) | 198 | 178 | 181 | 221 | 155 | 60 | 178 | 167 |
| | Room-temperature peel strength N/15 mm (25° C.) | 22 | 23 | 23 | 24 | 20 | 20 | 22 | 20 |
| Adhesion | Determination | ◎ | ◎ | ◎ | ◎ | ◎ | ◎ | ◎ | ◎ |
| | Hot peel strength N/15 mm (80° C.) | 13 | 14 | 14 | 18 | 16 | 12 | 6 | 5 |
| | Determination | ○ | ○ | ○ | ◎ | ◎ | ○ | X | X |
| Electrolyte resistance | Peel strength after immersion N/15 mm (25° C.) | 13 | 13 | 12 | 15 | 12 | 13 | 15 | 13 |
| | Determination | ○ | ○ | ○ | ◎ | ○ | ○ | ◎ | ○ |

| | | Comparative Example | | | | | |
|---|---|---|---|---|---|---|---|
| | | 3 | 4 | 5 | 6 | 7 | 8 |
| Component (A) | A1 | 15 | 15 | 15 | 15 | 15 | 15 |
| | A2 | | | | | | |
| | A3 | | | | | | |
| Organic solvent | Methylcyclohexane | 68 | 68 | 68 | 68 | 68 | 68 |
| | Methyl ethyl ketone | 17 | 17 | 17 | 17 | 17 | 17 |
| Curing catalyst | DBTL | 0.0015 | 0.0015 | 0.0015 | 0.0015 | 0.0015 | 0.0015 |
| Component (B) | TPA100 | | | | | 4.0 | |
| | N3200 | | | | | | |
| | HT | | | | | | |
| | XP2580 | | | | | | |
| | HDI | | | | | | |
| | TMDI | 2.0 | | | | | |
| Component (C) | Z4470 | | 3.0 | | | | 6.0 |
| | XP2565 | | | | | | |
| | D140N | | | | | | |
| | EPDC1241 | | | | | | |
| | IPDI | | | 3.0 | | | |
| | DDDI | | | | 3.0 | | |
| Liquidity | Viscosity mPa·s (25° C.) | 172 | 186 | 163 | 161 | 183 | 194 |
| | Room-temperature peel strength N/15 mm (25° C.) | 14 | 6 | 4 | 7 | 23 | 5 |
| Adhesion | Determination | ○ | X | X | X | ◎ | X |
| | Hot peel strength N/15 mm (80° C.) | 4 | 12 | 11 | 14 | 7 | 14 |
| | Determination | X | ○ | ○ | ○ | X | ○ |
| Electrolyte resistance | Peel strength after immersion N/15 mm (25° C.) | 9 | 2 | 5 | 3 | 14 | 3 |
| | Determination | X | X | X | X | ○ | X |

5) Evaluation Results

As is apparent from the results of Examples 1 to 14, the adhesive compositions of the present invention had room-temperature peel strength as high as 20 N/15 mm or higher, hot peel strength as high as 10 N/15 mm or higher, and thus excellent adhesiveness, as well as excellent electrolyte resistance.

In contrast, the adhesive compositions of Comparative Examples 1 to 8 contained the component (A), but contained only one of the components (B) and (C) as the isocyanate compound, and accordingly were low in either room-temperature peel strength or hot peel strength, and were inferior in adhesiveness.

INDUSTRIAL APPLICABILITY

The present invention relates to an adhesive composition and a heat-fusible member using the adhesive composition, which can be used in various fields of industrial products such as electric fields, automotive fields, and industrial fields; and belongs to these technical fields.

The present application claims a convention priority based on Japanese Patent Application No. 2017-124637 filed on Jun. 26, 2017, and the entire disclosure thereof is incorporated herein.

The invention claimed is:

1. An adhesive composition consisting essentially of:
an organic solvent;
a polyolefin (A) that has an acidic group and/or an acid anhydride group and is soluble in the organic solvent, wherein the polyolefin (A) has a weight average molecular weight of 15,000 to 200,000; and
isocyanate compounds consisting of:
   (B) a diisocyanate compound selected from the group consisting of hexamethylene diisocyanate, pentamethylene diisocyanate, tetramethylene diisocyanate and a derivative thereof, and
   (C) a diisocyanate compound selected from the group consisting of isophorone diisocyanate, norbornane diisocyanate, 4,4'-methylenebis(cyclohexyl isocyanate), dodecane diisocyanate, 1,3-bis(isocyanate methyl)cyclohexane, and a derivative thereof.

2. The adhesive composition according to claim 1, wherein the diisocyanate compound (B) is hexamethylene diisocyanate.

3. The adhesive composition according to claim 1, wherein the diisocyanate compound (C) is a diisocyanate compound having at least one secondary isocyanate group.

4. The adhesive composition according to claim 3, wherein the component (A) is (i) a polyolefin graft-modified with an acidic group-containing monomer and/or an acid anhydride group-containing monomer, and a graft amount thereof is 0.10 to 30 wt. %, or (ii) a polyolefin graft-modified with an esterified product of an alkyl alcohol having 8 to 18 carbon atoms with (meth)acrylic acid, and a graft amount thereof is 0.10 to 20 wt. %.

5. The adhesive composition according to claim 1, wherein the diisocyanate compound (C) is isophorone diisocyanate.

6. The adhesive composition according to claim 1, wherein the derivative of the diisocyanate compound (B) and/or the derivative of the diisocyanate compound (C) comprise at least one bond selected from the group consisting of an isocyanurate bond, a biuret bond, a urethane bond and an allophanate bond.

7. The adhesive composition according to claim 1, wherein the component (A) is a polyolefin graft-modified with an acidic group-containing monomer and/or an acid anhydride group-containing monomer, and a graft amount thereof is 0.10 to 30 wt. %.

8. The adhesive composition according to claim 7, wherein the diisocyanate compound (C) is isophorone diisocyanate.

9. The adhesive composition according to claim 1, wherein the component (A) is a polyolefin graft-modified with an esterified product of an alkyl alcohol having 8 to 18 carbon atoms with (meth)acrylic acid, and a graft amount thereof is 0.10 to 20 wt. %.

10. The adhesive composition according to claim 1, wherein
(A) is a polyolefin graft-modified with an acidic group-containing monomer and/or an acid anhydride group-containing monomer, a graft amount thereof of 0.10 to 30 wt. %; and
the derivative of the diisocyanate compound (B) and/or the derivative of the diisocyanate compound (C) comprise at least one bond selected from the group consisting of an isocyanurate bond, a biuret bond, a urethane bond and an allophanate bond.

11. The adhesive composition according to claim 1, wherein
the diisocyanate compound (B) is hexamethylene diisocyanate; and the diisocyanate compound (C) is a diisocyanate compound having at least one secondary isocyanate group.

12. The adhesive composition according to claim 1, wherein an equivalent ratio (NCO/COOH) of isocyanate groups in the isocyanate compound to carboxylic acid groups in the component (A) is 0.01 to 12.0.

13. The adhesive composition according to claim 1, wherein the diisocyanate compound (B) constitutes 20 to 50 wt. % of the total amount of the diisocyanate compound (B) and the diisocyanate compound (C), and the diisocyanate compound (C) constitutes 50 to 80 wt. % of the total amount of the diisocyanate compound (B) and the diisocyanate compound (C).

14. The adhesive composition according to claim 1, wherein an equivalent ratio (NCO/COOH) of isocyanate groups in the isocyanate compound to carboxylic acid groups in the polyolefin (A) is 0.01 to 9.0.

15. The adhesive composition according to claim 1, wherein the weight average molecular weight of polyolefin (A) is 30,000 to 200,000.

16. The adhesive composition according to claim 15, wherein the weight average molecular weight of polyolefin (A) is 30,000 to 150,000.

17. The adhesive composition according to claim 1, which consists of said organic solvent, said polyolefin (A), said isocyanate compounds consisting of the diisocyanate compound (B) and the diisocyanate compound (C), and optionally at least one component (D) selected from the group consisting of a curing catalyst, a styrenic thermoplastic elastomer, a tackifier, an antioxidant, a hindered amine-based light stabilizer, an ultraviolet absorber, an antistatic agent, a flame retardant, a colorant, a dispersant, an adhesion-imparting agent, an antifoaming agent, a leveling agent, a plasticizer, a lubricant, and a filler.

18. A heat-fusible member comprising:
an adhesive layer formed by curing the adhesive composition according to claim 1;
a metal layer bonded to one side of the adhesive layer; and a heat-fusible resin layer bonded to the other side of the adhesive layer.

19. A packaging material for a lithium ion battery, comprising the heat-fusible member according to claim 18.

20. An adhesive composition formed from components consisting essentially of:
   (a) an organic solvent;
   (b) at least one polyolefin (A) that has an acidic group and/or an acid anhydride group and is soluble in the organic solvent, wherein the polyolefin (A) has a weight average molecular weight of 15,000 to 200,000,
   (c) diisocyanate compounds consisting of:
      (B) a diisocyanate compound selected from the group consisting of hexamethylene diisocyanate, pentamethylene diisocyanate, tetramethylene diisocyanate and a derivative thereof, and
      (C) a diisocyanate compound selected from the group consisting of isophorone diisocyanate, norbornane diisocyanate, 4,4'-methylenebis(cyclohexyl isocyanate), dodecane diisocyanate, 1,3-bis(isocyanate methyl)cyclohexane, and a derivative thereof,
   wherein when forming the adhesive composition
      the total amount of the isocyanate compounds is the combined amount of (B) and (C),
      (B) constitutes 20 to 50 wt. % of the total amount of (B) and (C),
      (C) constitutes 50 to 80 wt. % of the total amount of (B) and (C), and
      an equivalent ratio (NCO/COOH) of isocyanate groups in (B) and (C) to carboxylic acid groups in the at least one polyolefin (A) is 0.01 to 9.0; and
   (d) optionally at least one component (D) selected from the group consisting of a curing catalyst, a styrenic thermoplastic elastomer, a tackifier, an antioxidant, a hindered amine-based light stabilizer, an ultraviolet absorber, an antistatic agent, a flame retardant, a colorant, a dispersant, an adhesion-imparting agent, an antifoaming agent, a leveling agent, a plasticizer, a lubricant, and a filler.

21. The adhesive composition according to claim 20, wherein the adhesive composition is obtained by (i) preparing a liquid resin composition from (a) the organic solvent and (b) the at least one polyolefin (A); and (ii) blending and mixing the liquid resin composition and the isocyanate compounds (c).

22. The adhesive composition according to claim 21, wherein (ii) diisocyanate compound (B) and diisocyanate compound (C) are individually blended and mixed with the liquid resin composition.

23. The adhesive composition according to claim 20, wherein in diisocyanate compounds (c), diisocyanate compound (B) is a derivative having an isocyanurate bond and diisocyanate compound (C) is a derivative having an isocyanurate bond.

* * * * *